(12) United States Patent
Sawazaki et al.

(10) Patent No.: US 7,948,494 B2
(45) Date of Patent: May 24, 2011

(54) CHARACTER RENDERING DEVICE, DISPLAY DEVICE, AND PRINTER

(75) Inventors: Takashi Sawazaki, Chofu (JP); Yoshiyuki Ono, Hino (JP); Akira Saito, Sagamihara (JP)

(73) Assignee: Seiko Epson Corporation, Tokyo (JP)

( * ) Notice: Subject to any disclaimer, the term of this patent is extended or adjusted under 35 U.S.C. 154(b) by 821 days.

(21) Appl. No.: 11/984,599

(22) Filed: Nov. 20, 2007

(65) Prior Publication Data

US 2008/0238924 A1     Oct. 2, 2008

(30) Foreign Application Priority Data

Mar. 26, 2007   (JP) .................. 2007-079826

(51) Int. Cl.
   *G06T 11/20*   (2006.01)
(52) U.S. Cl. .................................... 345/467
(58) Field of Classification Search ............. 345/467
   See application file for complete search history.

(56) References Cited

U.S. PATENT DOCUMENTS

| | | | | |
|---|---|---|---|---|
| 5,105,471 A | * | 4/1992 | Yoshida et al. | 382/297 |
| 5,355,448 A | * | 10/1994 | Uchino | 345/467 |
| 5,394,514 A | * | 2/1995 | Matsubara | 358/1.16 |
| 5,473,709 A | * | 12/1995 | Aoki | 382/258 |
| 5,499,332 A | * | 3/1996 | Yoshida | 345/467 |
| 5,526,476 A | | 6/1996 | Motokado et al. | |
| 5,557,707 A | * | 9/1996 | Inoue et al. | 358/1.6 |
| 5,696,984 A | | 12/1997 | Nagata et al. | |
| 5,909,221 A | * | 6/1999 | Nakai et al. | 345/619 |
| 5,917,501 A | | 6/1999 | Müller et al. | |
| 6,577,314 B1 | * | 6/2003 | Yoshida et al. | 345/471 |
| 2002/0154122 A1 | * | 10/2002 | Di Lelle | 345/467 |

FOREIGN PATENT DOCUMENTS

| | | |
|---|---|---|
| EP | 0 837 005 A1 | 4/1998 |
| JP | A 9-230844 | 9/1997 |

* cited by examiner

*Primary Examiner* — Javid A Amini
(74) *Attorney, Agent, or Firm* — Oliff & Berridge, PLC

(57) ABSTRACT

A character rendering device includes: a first drawing unit that divides a shape of a character represented by character shape data into partial areas, and renders the shape of the character area by area; a second drawing unit that renders the character on the basis of the shape of the character drawn by the first drawing unit; a transfer unit that transfers the rendered character; a first memory that stores data; a second memory whose read/write rate is lower than that of the first memory, and whose storage capacity is larger than that of the first memory; and a selection unit that, if a number of the partial areas created by the first drawing unit is equal to or smaller than a threshold value, selects the first memory, and if the number of the partial areas is larger than the threshold value, selects the second memory.

9 Claims, 10 Drawing Sheets

| CONTROL POINT NO. | TYPE OF CONTROL POINT | POSITION |
|---|---|---|
| 1 | ON-CURVE | (x1,y1) |
| 2 | ON-CURVE | (x2,y2) |
| 3 | OFF-CURVE | (x3,y3) |
| 4 | ON-CURVE | (x4,y4) |
| ⋮ | ⋮ | ⋮ |
| 12 | ON-CURVE | (x12,y12) |
| NUMBER OF CONTOURS | 2 | |
| CONTROL POINT NO. OF END POINT | 7,12 | |

CHARACTER RENDERING DEVICE, DISPLAY DEVICE, AND PRINTER

The entire disclosure of Japanese Patent Application No. 2007-079826 filed on Aug. 16, 2006 is expressly incorporated by reference herein.

BACKGROUND

1. Technical Field

The present invention relates to a technology for rendering a character to be displayed or printed.

2. Related Art

To render a character to be displayed or printed on a paper, font data representing the shape of the characters is required. Font data has one of three formats; namely, a bitmap format, an outline format, and a stroke format. In a process of rendering a character using outline font data, three steps are necessary; namely, steps of "Outline Drawing" in which the outline of a character is drawn, "Filling" in which an area inside the outline is filled, and "Transferring" in which bit-mapped data of the drawn character is transferred to a display device or a printer. The three steps can be performed in parallel with each other, according to a certain method.

For the steps of rendering a character using outline font data to be carried out, a memory for temporarily storing data for processing is required. If the data size of a character to be rendered is greater than the capacity of a memory, the character is divided into plural partial areas, and drawn area by area, according to a certain method. In connection with the method, a method of determining whether a character should be rendered in plural areas on the basis of the font size of the character is proposed in JP-A-9-230844.

It is desirable that rendering of a character be performed as speedily as possible. In view of this, the present invention provides a technique of rendering a character at a high speed, regardless of the capacity of a memory in use.

SUMMARY

An aspect of the present invention provides a character rendering device comprising: a first drawing unit that divides a shape of a character represented by character shape data into partial areas, and renders the shape of the character area by area; a second drawing unit that renders the character on the basis of the shape of the character drawn by the first drawing unit; a transfer unit that transfers the character rendered by the second drawing unit; a first memory that stores data; a second memory whose read/write rate is lower than that of the first memory, and whose storage capacity is larger than that of the first memory; and a selection unit that, if a number of the partial areas created by the first drawing unit is equal to or smaller than a threshold value, selects the first memory, and if the number of the partial areas is larger than the threshold value, selects the second memory. In the character rendering device, if the first memory is selected by the selection unit, the first drawing unit writes data of the rendered shape of the character in the first memory, and the second drawing unit reads out the data of the shape of the character from the first memory and renders the character on the basis of the shape of the character, and if the second memory is selected by the selection unit, the first drawing unit writes data of the rendered shape of the character in the second memory, and the second drawing unit reads out the data of the shape of the character from the second memory and renders the character on the basis of the shape of the character. According to the character rendering device, a character can be rendered at a high speed.

The above character drawing device may further comprise: a first bus that is connected to the second memory via an external bus; a second bus that is connected to the first memory; and a connector that connects the first bus and the second bus. In the character rendering device, the first drawing unit may be connected to the first bus and the second bus, and if the first memory is selected by the selection unit, the first drawing unit may write data of the rendered shape of the character in the first memory via the second bus, and if the second memory is selected by the selection unit, the first drawing unit may write data of the rendered shape of the character in the second memory via the first bus and the external bus. In the character rendering device, the second writing unit may be connected to the second bus, and if the first memory is selected by the selection unit, the second drawing unit may read out the data of the shape of the character from the first memory via the second bus and render the character on the basis of the shape of the character, and if the second memory is selected by the selection unit, the second drawing unit may read out the data of the shape of the character from the second memory via the external bus, the first bus, the connector, and the second bus, and render the character on the basis of the shape of the character. According to the character rendering device, the number of memory addresses to be managed can be reduced.

Alternatively, the above character rendering device may further comprise: a first bus that is connected to the second memory via an external bus; a second bus that is connected to the first memory; and a connector that connects the first bus and the second bus. In the character rendering device, the first drawing unit may be connected to the first bus and the second bus, and if the first memory is selected by the selection unit, the first drawing unit may write data of the drawn shape of the character in the first memory via the second bus, and if the second memory is selected by the selection unit, the first drawing unit may write data of the drawn shape of the character in the second memory via the first bus and the external bus. In the character rendering device, the second writing unit may be connected to the first bus and the second bus, and if the first memory is selected by the selection unit, the second drawing unit may read out the data of the shape of the character from the first memory via the second bus and render the character on the basis of the shape of the character, and if the second memory is selected by the selection unit, the second drawing unit may read out the data of the shape of the character from the second memory via the external bus and the first bus, and render the character on the basis of the shape of the character. According to the character rendering device, a character can be rendered without a connector for connecting a first bus and a second bus.

Alternatively, in the above character rendering device, the first memory and the second memory each may have a plurality of memory areas, and each of the plurality of memory areas may be assigned to each of the partial areas, and the first drawing unit may write data of the rendered shape of the character belonging to one of the partial areas in one of the plurality of memory areas assigned to the partial area, and when the data of the shape of the character is written in one of the partial areas in one of the plurality of memory areas, the second drawing unit may read out the shape of the character from the memory area and render the character on the basis of the shape of the character. According to the character rendering device, a character can be rendered at a high speed.

Alternatively, in the above character rendering device, the character shape data may be outline font data, and the first drawing unit may render an outline of the character on the basis of the outline font data, and the second drawing unit may fill an area surrounded by the outline of the character to render the character.

Alternatively, in the above character rendering device, the character shape data may be stroke font data, and the first drawing unit may render a center line of a stroke forming the character on the basis of the stroke font data, and the second drawing unit may paint a periphery of the center line of the stroke forming the character to render the character.

Another aspect of the present invention provides a display device comprising: the above character rendering device; and a display that displays the character transferred by the transfer unit. According to the display device, a rendered character can be displayed on a screen.

Another aspect of the present invention provides a printer comprising: the above character rendering device; and a printing unit that prints the character transferred by the transfer unit. According to the display device, a rendered character can be printed on a sheet.

DESCRIPTION OF EXEMPLARY EMBODIMENTS

The most-preferred embodiment of the present invention will now be described.

1. Configuration of Embodiment

Figure 1:
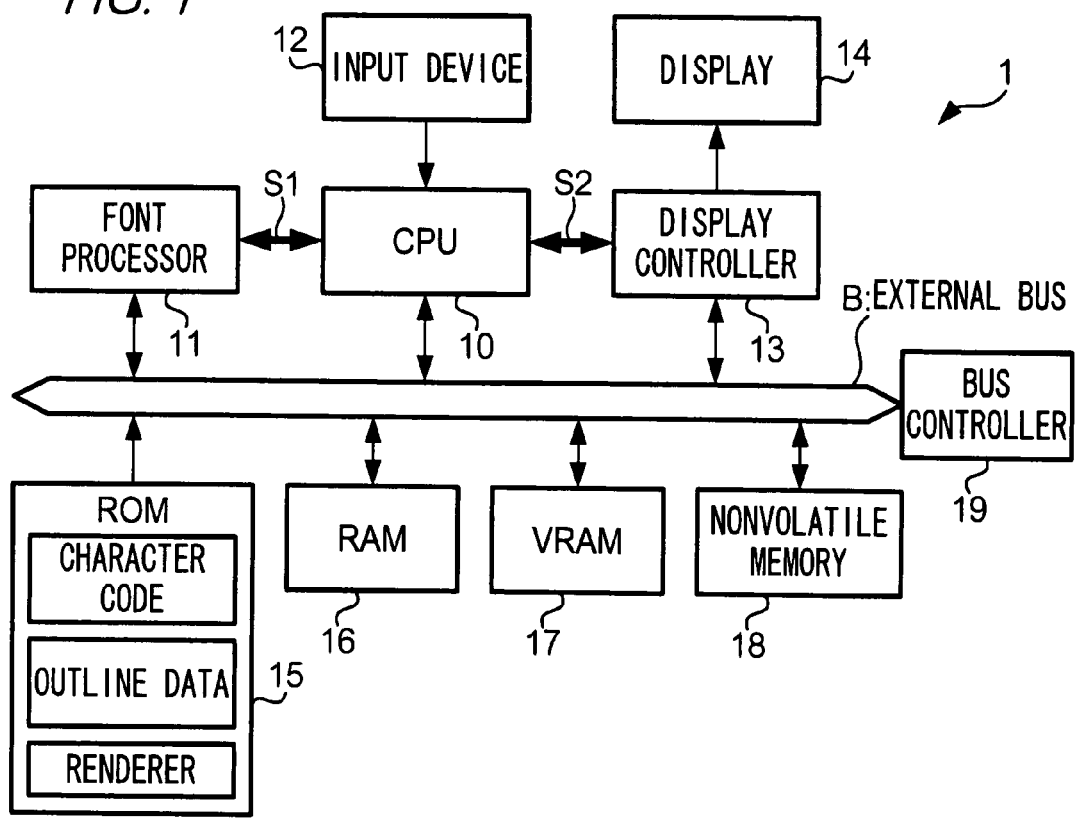
FIG. 1 is a diagram illustrating a hardware diagram of an image display device according to an embodiment of the present invention.

FIG. 1 is a diagram illustrating a hardware configuration of image display device 1.

As shown in the drawing, image display device 1 includes CPU 10, font processor 11, input device 12, display controller 13, display 14, ROM (Read Only Memory) 15, RAM (Random Access Memory) 16, VRAM (Video Random Access Memory) 17, nonvolatile memory 18, and bus controller 19.

CPU 100 reads out a control program stored in ROM 15, deploys the program in RAM 16, and runs the program. ROM 15 stores outline font data (hereinafter, referred to as "outline data") and corresponding character codes. RAM 16, if necessary, can be logically divided into two work areas of RAM 16-1 and RAM 16-2, each of which can be individually accessed by each module. RAM 16-1 and RAM 16-2 are, in the following description, collectively referred to as "RAM 16", except where it is necessary to specify otherwise.

ROM 15 stores an OS (Operating System) and a renderer, which are executed by CPU 10. A renderer is a program for displaying characters on display 14 on the basis of outline data. Input device 12 is a device manipulated by a user such as a keyboard, a mouse, a pen device, or a joystick, and provides a signal corresponding to a user's manipulation of input device 12, to CPU 10.

CPU 10, in accordance with a signal provided from input device 12, reads out outline data from ROM 15, and transfers it to font processor 11. Font processor 12 interprets outline data, converts it into bit-mapped image data, and writes it in VRAM 17. It is to be noted that VRAM 17 may be a part of RAM 16. Image data stored in VRAM 17 is, under the control of CPU 10, provided to display controller 13. Display controller 13 controls display 14 to display an image on a screen of display 14. Display 14 may be a cholesteric liquid crystal display or an electrophoretic display, and is capable of holding images indefinitely without drawing electricity. Nonvolatile memory 18 is a nonvolatile recording medium such as a flash memory or a hard disk. Bus controller 19 controls access to modules connected to external bus B to prevent each component from being accessed by plural components simultaneously.

Signal line S1 connects CPU 10 and font processor 11. CPU 10 sends an instruction to start rendering a character (character rendering instruction) to font processor 11 through signal line S1, and font processor 11 sends a signal notifying that rendering of a character is completed (completion notification signal) to CPU 10 through signal line S1. Signal line S2 connects CPU 10 and display controller 13. CPU 10 sends an instruction, at a predetermined refresh rate, to display controller 13 to refresh display 14 via signal line S2. However, if display 14 is not a "zero-power" display, refreshing of display 14 is controlled by display controller 13, and therefore signal line S2 is not necessary.

When image display device 1 is powered on, each module is reset. CPU 10 executes a boot program stored in ROM 15 to execute an OS. After that, CPU 10 executes a control program stored in ROM 15 to start a character rendering process.

Figure 2:
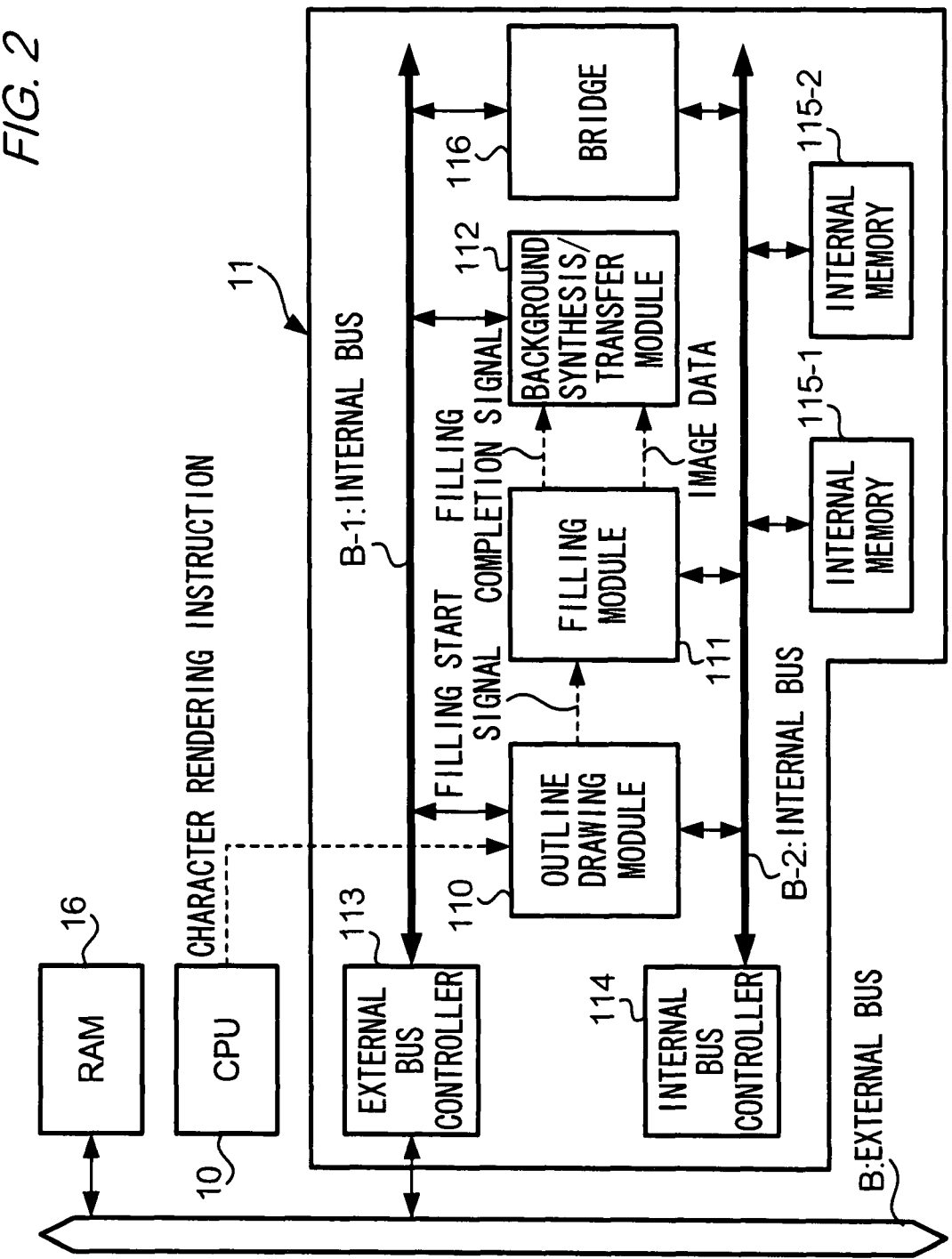
FIG. 2 is a diagram illustrating a hardware configuration of a font processor.

FIG. 2 is a diagram illustrating a hardware configuration of font processor 11.

As shown in the drawing, font processor 11 includes outline drawing module 110, filling module 111, background synthesis/transfer module 112, external bus controller 113, internal bus controller 114, internal memory 115, bridge 116, internal bus B-1, which is the first bus, and internal bus B-2, which is the second bus. Internal memory 115 is logically divided into two work areas of internal memory 115-1 and internal memory 115-2, each of which can be individually accessed by each module. Internal memory 115-1 and internal memory 115-2 are, in the following description, collectively referred to as "internal memory 115", except where it is necessary to specify otherwise. Similarly, internal memory 15 and RAM 16 are, if necessary, collectively referred to as "memory".

External bus controller 113 controls access to outline drawing module 110 and background synthesis/transfer module 112 to prevent the modules from being accessed simultaneously. External but controller 113 also enables data exchange between external bus B and internal bus B-1. Internal bus controller 114 controls access to internal memory 115 to prevent the module from being accessed by outline drawing module 110 and filling module 111 simultaneously. Bridge 116 connects internal bus B-1 and internal bus B-2.

When an outline drawing and a filling of a character are performed, either internal memory 115 (first memory), which is inside font processor 11, or RAM 16 (second memory), which is outside font processor 11, is used. The read/write rate of RAM 16 is lower than that of internal memory 115, but the storage capacity of RAM 16 is larger than that of internal memory 115. Thus, if a character size is larger than a predetermined size, CPU 10 selects RAM 16, which is a first memory, and if a character size is equal to or smaller than the predetermined size, CPU 10 selects internal memory 115, which is a second memory.

1-1. Outline Drawing of Character

Outline drawing module 110, which is a first rendering unit, is connected to internal bus B-1 and internal bus B-2. Outline drawing module 110 generates, on the basis of outline data provided from ROM 15 through external bus B and internal bus B-1, bit-mapped image data representing the outline of a character (hereinafter, referred to as "contour data"), and writes the contour data in a memory (RAM 16 or internal memory 115) selected by CPU 10. If contour data is written in RAM 16, the data is written in RAM 16 through internal bus B-1 and external bus B. On the other hand, if contour data is written in internal memory 115, the data is written in internal memory 115 through internal bus B-2.

Figure 3:
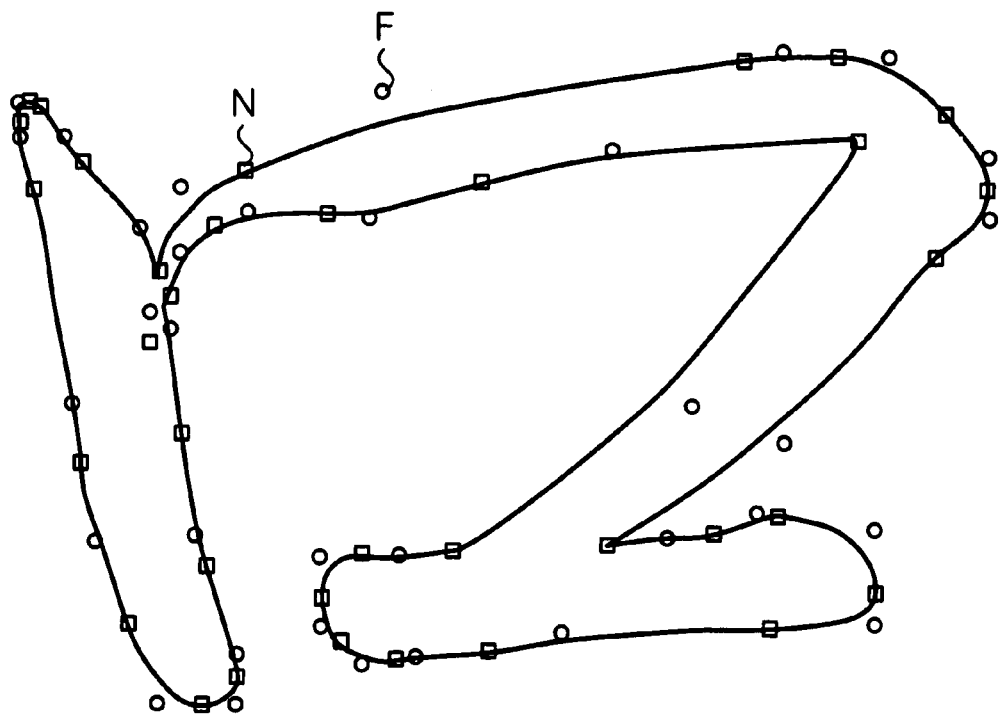
FIG. 3 is a diagram illustrating an image displayed on an image display device, in which control points of the TTF are shown.

Now, an operation of drawing the outline of a character by outline drawing module 110 will be described in detail. In the operation, outline data of a TTF (True Type Font) is used. FIG. 3 is a diagram illustrating a Chinese character "口" expressed in the TTE In the drawing, square marks and circular marks, which are control points, are arranged along the outline of the character. A square mark indicates on-curve control point, and a circular mark indicates off-curve control point, which is also true in the other drawings.

In the TTF, the outline of a character is expressed by one or more contours. A contour is a closed loop formed by straight lines and/or quadratic Bezier curves. A straight line is drawn between consecutive two on-curve control points. A quadratic Bezier curve is drawn between two on-curve control points adjacent to an off-curve point. If two off-curve control points are consecutively arranged, an on-curve control point is provided as a midpoint between the off-curve points, and two quadratic Bezier curves are drawn between the on-curve control point and on-curve control points adjacent to the off-curve control points.

Figure 4:
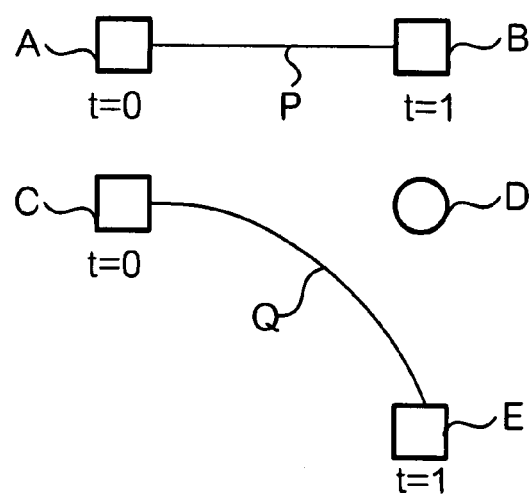
FIG. 4 is a diagram illustrating a contour connecting control points.

For example, assuming that control points A, B, C, and E of FIG. 4 are on-curve control points, and control point D is an off-curve control point, straight line A-B and quadratic Bezier curve C-D-E are expressed as a set of point P and a set of point Q (quadratic Bezier curve), respectively.

$$P=(1-t)A+tB$$

$$Q=(1-t)^2C+2t(1-t)D+t^2E$$

In the expressions, t is a parameter which continuously varies within a range of $0 \leq t \leq 1$. In the straight line A-B, if the parameter t is 0, point P is located at the position of control point A, and if the parameter t is 1, point P is located at the position of control point B. In the quadratic Bezier curve C-D-E, if the parameter t is 0, point Q is located at the position of control point C, and if the parameter t is 1, point Q is located at the position of control point E.

Figures 5, 6:
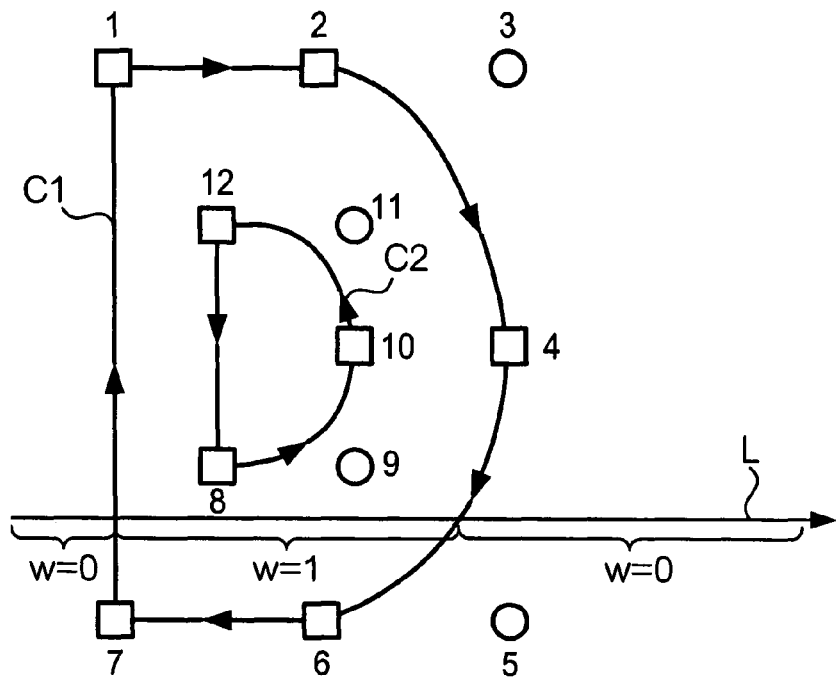
FIG. 5 is a diagram illustrating information included in outline data which contains data on control points of the TTF.
FIG. 6 is a diagram illustrating contours connecting control points.

FIG. 5 is a diagram illustrating outline data for rendering a character.

As shown in the figure, outline data contains control point numbers assigned to control points in ascending order, the types of the control points indicating an on-curve control point or an off-curve control point, and the positions of the control points on a plane surface, namely X-Y coordinates. A single piece of outline data corresponds to the outline of a single character, and is associated with the number of contours forming a character represented by the outline data and the control point numbers of the end points of the contours. For example, the outline of an alphabet "D" shown in FIG. 6 is formed by two contours c1 and c2; namely, the number of contours is two, as shown in FIG. 5. The control point number of the end point of contour c1 is "7", and the control point number of the end point of contour c2 is "12"; namely, the control point numbers of the end points of the contours are "7" and "12", as shown in FIG. 5.

Outline drawing module 110, as described above, interprets outline data to work out the outline of a character, and generates bit-mapped image data representing the outline. Outline drawing module 110 writes the bit-mapped image data in a memory selected by CPU 10, as contour data.

1-2. Filling of Character

After contour data is written as described above, filling module 111, which is the second rendering unit, reads out contour data from a memory (RAM 16 or internal memory 115) selected by CPU 10, and generates image data where an area surrounded by a contour represented by the contour data is filled with colored pixels. If the contour data is read out from RAM 16, the data is read out from RAM 16 through external bus B, internal bus B-1, bridge 116, and internal bus B-2. On the other hand, if the contour data is read out from internal memory 115, the data is read out from internal memory 115 through internal bus B-2.

Now, an operation of filling module 111 will be described in detail.

Filling module 111 reads out contour data from internal memory 115 or RAM 16, and scans contours represented by the contour data in a predetermined direction (e.g., horizontally) to identify intersections of the scanning line with the contours. Filling module 111 holds parameter w, whose initial value is 0, and determines whether a scanning line intersects with a contour extending upward or a contour extending downward. As a result of the determination, if a scanning intersects with a contour extending upward, filling module 111 increases parameter w by one, whereas if a scanning line intersects with a contour extending downward, filling module 111 reduces parameter w by one. In a case of FIG. 6, a locus of scanning line L is divided into plural sections by contours c1 and c2, and in a section of w=0, filling module 111 does nothing, whereas in a section of w=1, filling module 111 arranges colored pixels. Filling module 111 performs a filling operation for each scanning line, and sends processed image data to background synthesis/transfer module 12.

Figure 7:
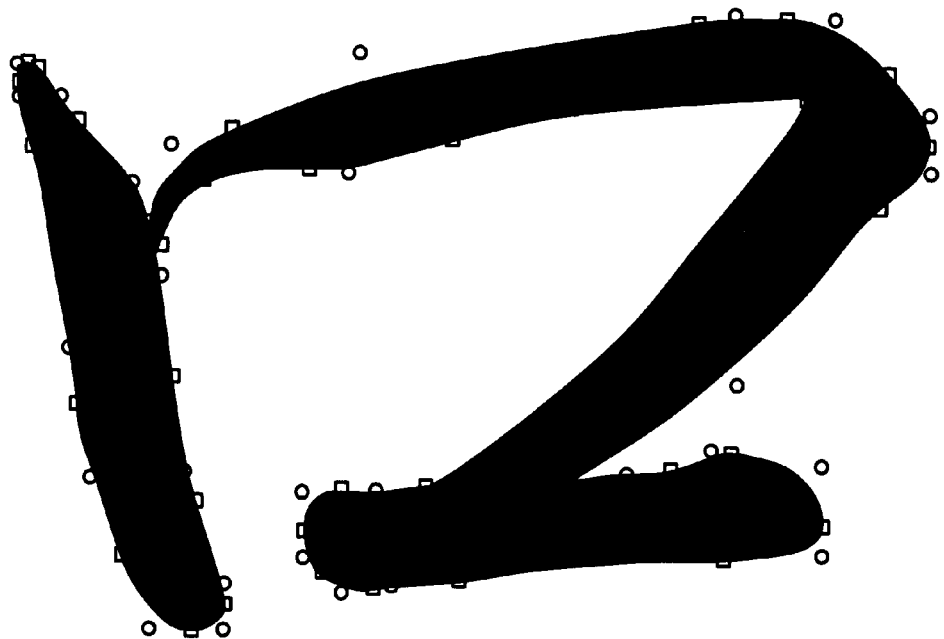
FIG. 7 is a diagram illustrating an image of a character whose outline is formed by contours and whose area inside the contours is filled.

As a result of a filling operation, for example, if an area within a contour formed by control points of FIG. 3 is filled, an image of a Chinese character "口" shown in FIG. 7 is rendered. FIG. 7 shows on-curb control points and off-curb control points for convenience of explanation, but they are not shown in an actual image.

1-3. Transfer of Character

Background synthesis/transfer module 112 generates image data in which image data provided from filling module 111 is synthesized with a predetermined background image. Specifically, background synthesis/transfer module 112 reads out image data representing a background image from VRAM 17 via internal bus B-1 and external bus B, and generates image data in which a character is drawn on the background image. After that, background synthesis/transfer module 112 writes the image data in an area of VRAM 17 which corresponds to an appropriate display position on a screen of display 14, and sends a completion notification signal to CPU 10 through internal bus B-1. In response to the completion notification signal, CPU 10 transfers image data stored in VRAM 17 to display controller 13.

1-4. Division of Character Rendering

An operation of each module will be described in chronological order, taking a case where internal memory 115 is used.

Figure 9:
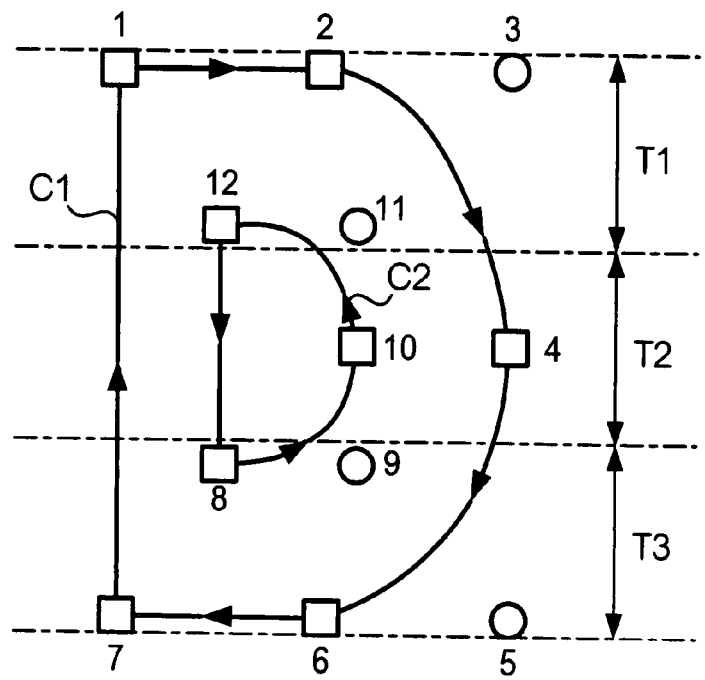
FIG. 9 is a diagram illustrating a method of dividing a character.
Figure 8:
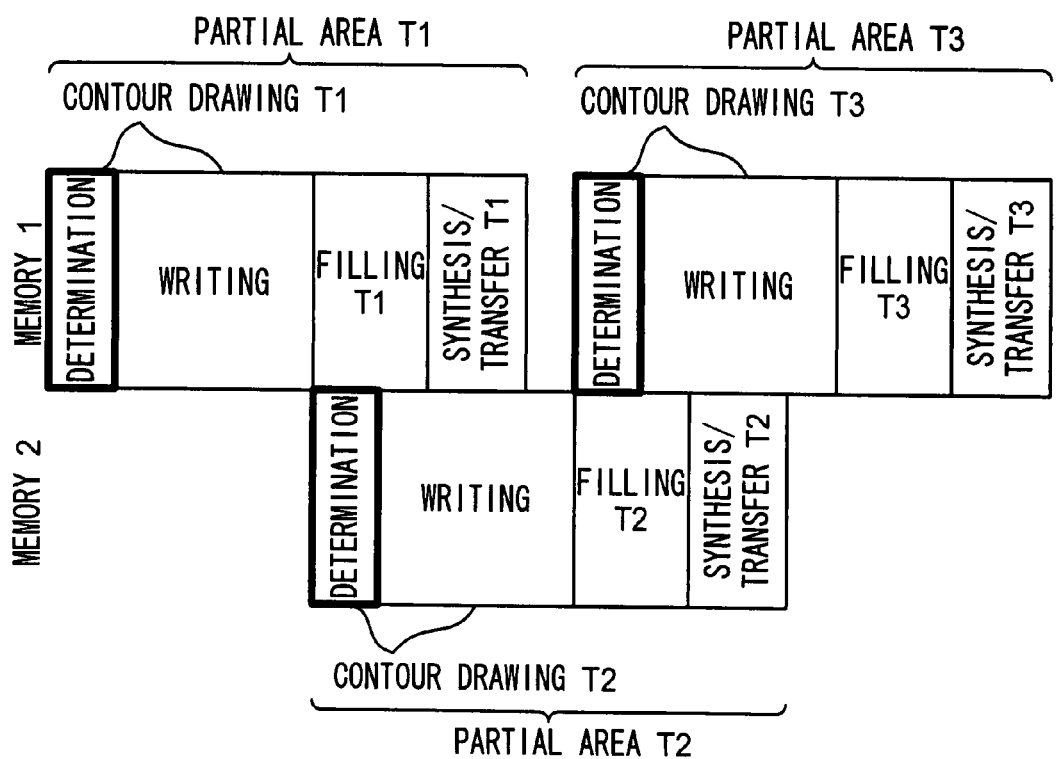
FIG. 8 is a diagram illustrating an operation performed by each module in chronological order.

FIG. 8 is a diagram illustrating an operation of each module, arranged in chronological order. The operation of FIG. 8 assumes a case where a character "D" shown in FIG. 9 is divided into three partial areas T1, T2, and T3, and drawn area by area. In FIG. 8, "memory 1" refers to internal memory 115-1, and "memory 2" refers to internal memory 115-2. In the drawing, "outline drawing" refers to an operation of outline drawing module 110, "filling" refers to an operation of filling module 111, and "synthesis/transfer" refers to an operation of background synthesis/transfer module 112. In the drawing, "T1", "T2", and "T3", which are attached to the end of "outline drawing", "filling", and "synthesis/transfer", refer to partial area T1, partial area T2, and partial area T3, respectively.

Outline drawing module 110 performs outline drawing T1 using internal memory 115-1. Specifically, outline drawing module 110 determines an outline in partial area T1 of the character "D", which corresponds to a "determination" of FIG. 8. Since an outline of a character is expressed by contours, and a contour is determined by control points, as described above, outline drawing module 110 needs outline data of control points located in partial area T1 and control points adjacent to the control points (control points other than 5, 6, and 9 in FIG. 9). After determining an outline, outline drawing module 110 writes contour data in internal memory 115-1, which corresponds to "writing" of FIG. 8.

Subsequently, filling module 111 reads out contour data of partial area T1 from internal memory 115-1, and performs filling T1. At the same time, outline drawing module 110 performs outline drawing T2 using internal memory 115-2, in which outline drawing module 110 determines an outline in partial area T2 and writes contour data in internal memory 115-2. Filling module 111 reads out contour data from internal memory 115-1 via internal bus B-2, and generates image data of an image in which an area within contours is filled. After that, background synthesis/transfer module 112 generates image data where a character represented by the image data generated by filling module 111 is rendered on a background image, and writes the image data in VRAM 17.

After finishing outline drawing T2, outline drawing module 110 performs outline drawing T3 using internal memory 115-1, in which outline drawing module 110 determines an outline in partial area T3 and writes contour data in internal memory 115-1. At the same time, filling module 111 reads out contour data of partial area T2 from internal memory 115-2, and performs filling T2. After filling T2 is finished, background synthesis/transfer module 112 performs synthesis/transfer T2.

As is clear from the foregoing description, when a character is divided into plural areas and drawn area by area, outline drawing module 110 needs to perform a "determination" a number of times equal to a division number. Namely, as a division number increases, outline drawing module 110 needs more time to determine an outline.

On the other hand, if RAM 16 is selected as a memory for use, font processor 11 uses RAM 16-1 and RAM 16-2 instead of internal memory 115-1 and internal memory 115-2. Since RAM 16 has a storage capacity larger than that of internal memory 115, a division number of the case where RAM 16 is used is smaller than that of the case where internal memory 115 is used. As a corollary, the number of processes for determining an outline of a character is also smaller. Therefore, in a case where determining an outline of a character takes longer than reading and writing data due to a high division number, a time required for rendering a character is shortened by use of RAM 16.

Specified value P is an upper limit of a division number which realizes character rendering using internal memory 115 in a shorter time than that required when using RAM 16. Thus, if a division number exceeds specified value P, use of RAM 16 realizes character rending in a shorter time than that required when using internal memory 115. Specified value P is determined on the basis of a time required for reading and writing data of internal memory 115 by each module, a time required for reading and writing data of RAM 16 by each module, and a time required for determining an outline of a character. In the following description, if a division number is equal to or smaller than specified value P, CPU 10 selects internal memory 115 as a work area, and if a division number is larger than specified value P, CPU 10 selects RAM 16 as a work area. CPU 10 notifies a result of the selection to photo processor 11.

2. Operation of Embodiment

An operation of image display device 1 will be described.

2-1. Basic Operation of CPU 10

Figure 10:
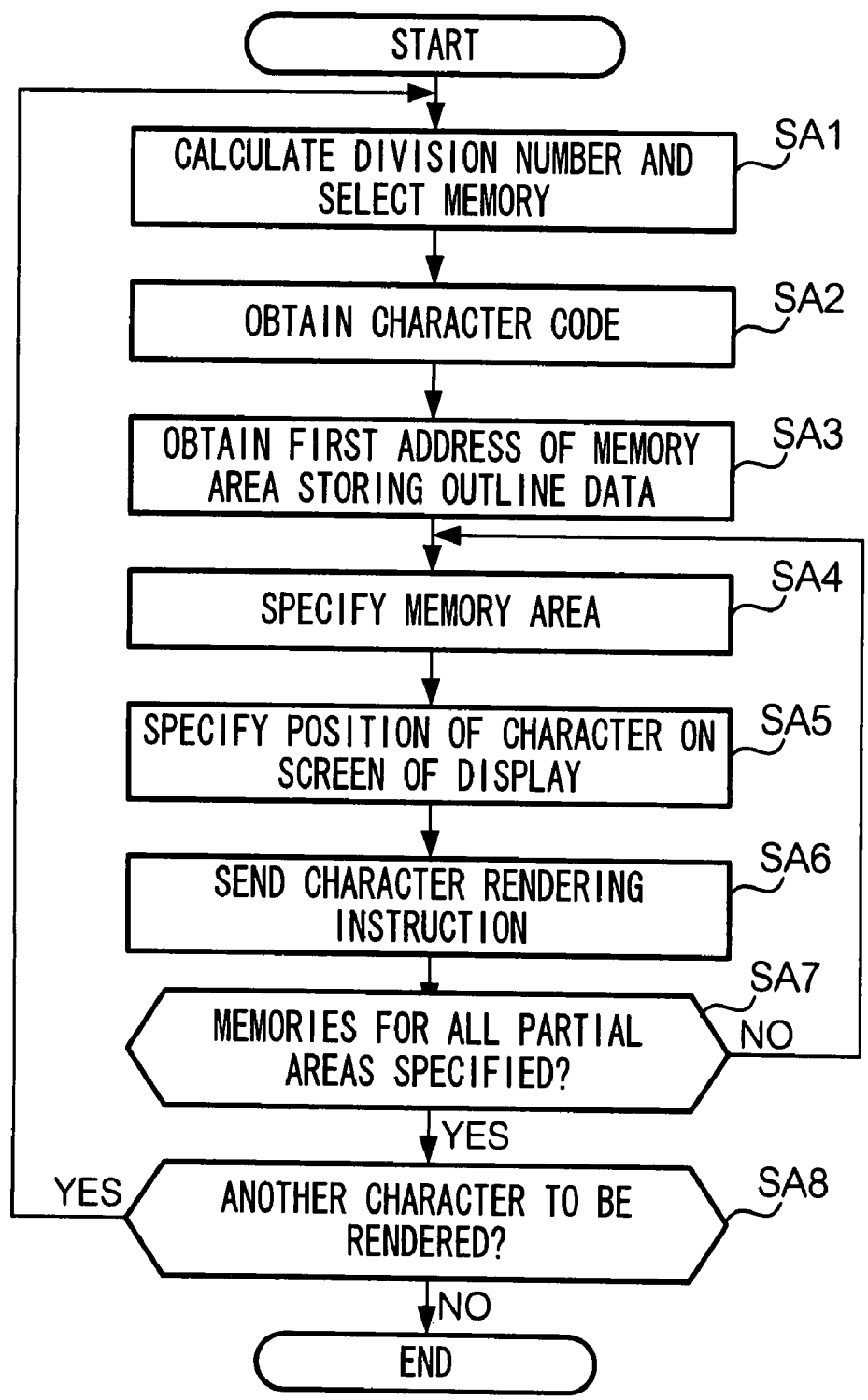
FIG. 10 is a flowchart of an operation performed by a CPU.

FIG. 10 is a flowchart of an operation up to a provision of a character rendering instruction for each partial area from CPU 10 of image display device 1 to font processor 11.

When a user selects a character (e.g., "D") and a display size using input device 12, and instructs displaying of the character, CPU 10 performs an operation shown in FIG. 10 in accordance with the selected conditions.

CPU 10 calculates a division number on the basis of the size of the character to be rendered, and selects a memory depending on the division number (step SA1). Step SA1 will be described in detail later. After selecting a memory, CPU 10 obtains a character code of the character selected by a user, from ROM 15 (step SA2). A preferable character code is a known character code such as a shift JIS code or an ASCII code. CPU 10 obtains the first address of a memory area where outline data, which is necessary for drawing an outline of the letter "D", is stored (step SA3).

After obtaining the first address, CPU 10 specifies one of work areas of a memory (internal memory 115 or RAM 16) selected in step SA1 (step SA4). Specifically, if internal memory 115 is selected in step SA1, CPU 10 specifies either internal memory 115-1 or internal memory 115-2, and if RAM 16 is selected in step SA1, CPU 10 specifies either RAM 16-1 or RAM 16-2. Step SA4 will be described in detail later.

After specifying a work area, CPU 10 specifies a position of a character on the screen of display 14 (step SA5). After specifying a display position, CPU 10 generates a character rendering instruction including parameters selected or specified in steps SA1 to SA5, and sends the character rendering instruction to font processor 11 (step SA6). After sending a character rendering instruction, CPU 10 determines whether it has processed all partial areas (step SA7). If CPU 10 has not processed all partial areas (step SA7; NO), CPU 10 carries out steps SA4 to SA7 relative to partial areas remaining to be processed. On the other hand, if CPU 10 has processed all partial areas (step SA7; YES), CPU 10 determines whether there exists another character to be rendered (step SA8). For example, while a word-processing program is running, each time a character is selected by a user using input device 12 (step SA8; YES), CPU 10 performs a sequence of steps SA1 to SA7.

As described above, CPU 10 provides a character rendering instruction for each partial area to font processor 11, thereby causing font processor 11 to perform a character rendering process.

2-2. Calculation of Division Number and Selection of Memory by CPU 10

The above-mentioned operation of calculating a division number and selecting a memory, which is performed by CPU 10 in step SA1 of FIG. 10, will be described in detail.

Figure 11:
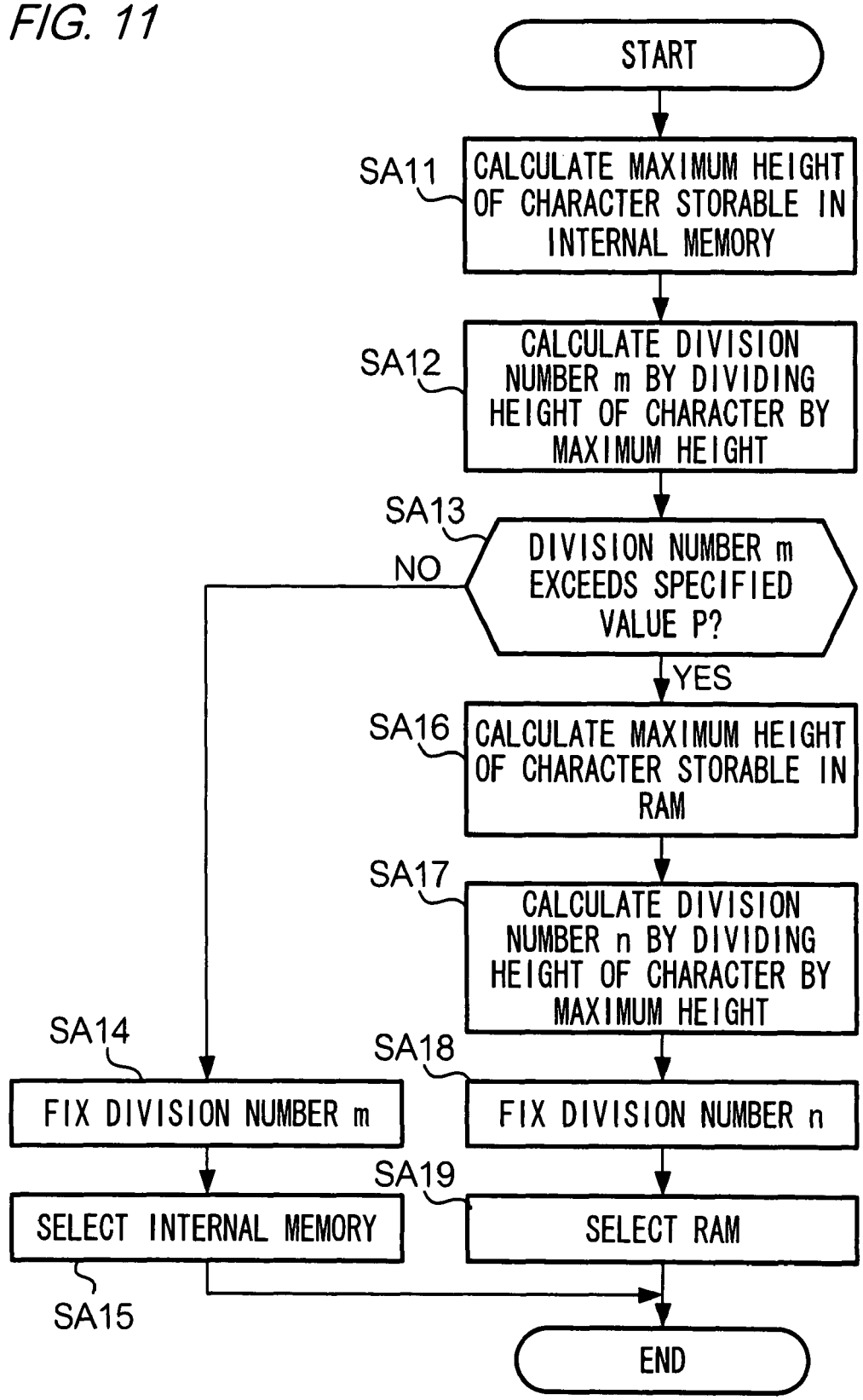
FIG. 11 is a flowchart of an operation performed by a CPU.

FIG. 11 is a detailed flowchart of the operation. CPU 10 calculates the maximum height of a character storable in internal memory 115 (step SA11). The height of a character means the maximum number of pixels of contour data in a height direction (in a sub-scanning direction) that is storable in internal memory 115. For example, if internal memory 115 is capable of storing pixel data of 1000 pixels, and the size of a character in a width direction (in a main scanning direction) is 100 pixels, the height of the character storable in internal memory 115 is 10 (1000/100) pixels.

After calculating the height of a character, CPU 10 calculates division number m by dividing the height of a character to be rendered by the height calculated in step SA11 (step SA12). For example, if the height of a character to be drawn is 42 pixels, the height calculated in step SA11 is 10 pixels, and the former is divided by the latter, the solution is 4.2, which means that five work areas are necessary to store contour data of the character. Namely, division number m is five.

After calculating division number m, CPU 10 determines whether division number m exceeds specified value P (threshold value) (step SA13). Specified value P is, for example, nine. If CPU 10 determines that division number m does not exceed specified value P (step SA14; NO), CPU 10 fixes division number m (step SA14), and selects internal memory 115 as a memory for use by font processor 11 (step SA15).

If CPU 10 determines that division number m exceeds specified value P (step SA13; YES), CPU 10 calculates the maximum height of a character storable in RAM 16 (step SA16). The height of a character in this context means, in analogy with the height of a character as described above, the maximum number of pixels of contour data in a height direction (in a sub-scanning direction) that is storable in RAM 16. For example, if RAM 16 is capable of storing pixel data of 10000 pixels, and the size of a character in a width direction (in a main scanning direction) is 100 pixels, the height of the character storable in RAM 16 is 100 (10000/100) pixels.

After calculating the height of a character, CPU 10 calculates division number n by dividing the height of a character to be rendered by the height calculated in step SA16 (step SA17). For example, if the height of a character to be drawn is 42 pixels, the height calculated in step SA16 is 100 pixels, and the former is divided by the latter, the solution is 0.42, which means that one work area of RAM 16 is necessary to store contour data of the character. Subsequently, CPU 10 fixes division number n (step SA18), and selects RAM 16 as a memory for use by font processor 11 (step SA19).

2-3. Specification of Work Area of Memory by CPU 10

The above-mentioned operation of specifying a work area for use by font processor 11, which is performed by CPU 10 in step SA4 of FIG. 10, will be described in detail. The operation assumes a case where internal memory 115 is used as a work area, but internal memory 115 can be replaced with RAM 116. When RAM 16 is used as a work area, RAM 16-1 is used instead of internal memory 115-1, and RAM 16-2 is used instead of internal memory 115-2.

Figure 12:
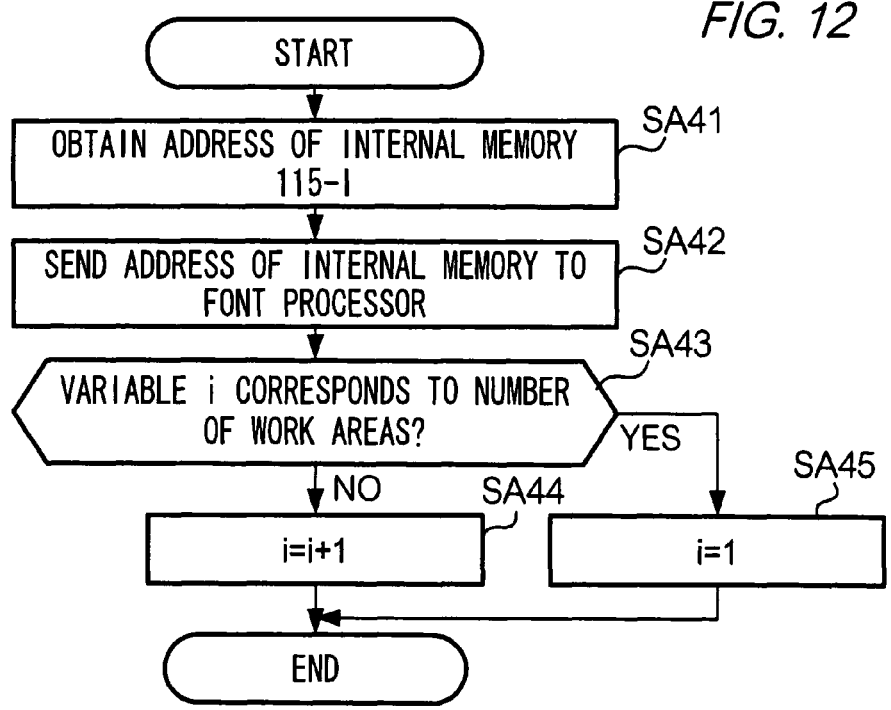
FIG. 12 is a flowchart of an operation performed by a CPU.

FIG. 12 is a flowchart of an operation of CPU 10 for specifying a work area. The operation assumes a case where CPU 10 specifies a work area for drawing a letter "D" shown in FIG. 9.

CPU 10 obtains an address of internal memory 115-i (i=1, 2) for use as a work area (step SA41). The initial value of variable i is 1, and CPU 10 obtains an address of a memory area of internal memory 115-1 where contour data of partial area T1 is stored. After obtaining an address of internal memory 115-i, CPU 10 sends the address of internal memory 115-i obtained in step SA41 to font processor 11, together with a character rendering instruction (step SA42). Namely, CPU 10 instructs font processor 11 to render a character of partial area T1 using internal memory 115-1.

CPU 10 determines whether variable i corresponds to the number of work areas that internal memory 115 has (step SA43). In the present embodiment, where internal memory 115 is divided into two work areas of internal memory 115-1 and internal memory 115-2, CPU 10 determines whether variable i is "2". Given that variable i is "1", CPU 10 determines that variable i does not correspond to the number of work areas of internal memory 115 (step SA43; NO). CPU 10 thus increments variable i by one to 2 (step SA44).

After incrementing variable i, CPU 10 performs steps SA41 to SA43 to specify a work area for use in rendering a character of partial area T2. Given that variable i is 2, CPU 10 obtains an address of a memory area of internal memory 115-2 where contour data of partial area T2 is stored (step SA41). CPU 10 then determines that variable i corresponds to the number of work areas that internal memory 115 has (step SA43; YES), and returns variable i from 2 to the initial value of 1 (step SA45).

Subsequently, when CPU 10 specifies a work area for use in rendering a character in partial area T3, CPU 10 obtains an address of internal memory 115-1 at step SA1, and performs a subsequent operation as in the case of specifying a work area for use in rendering a character in partial area T1.

As described above, CPU 10 specifies an internal memory for use by font processor 11. Since variable i changes in the order of 1, 2, 1, 2, 1, 2, . . . , CPU 10 notifies an address of internal memory 115-1 or 115-2 alternately to font processor 11.

2-4. Outline Drawing by Outline Drawing Module 110

Figure 13:
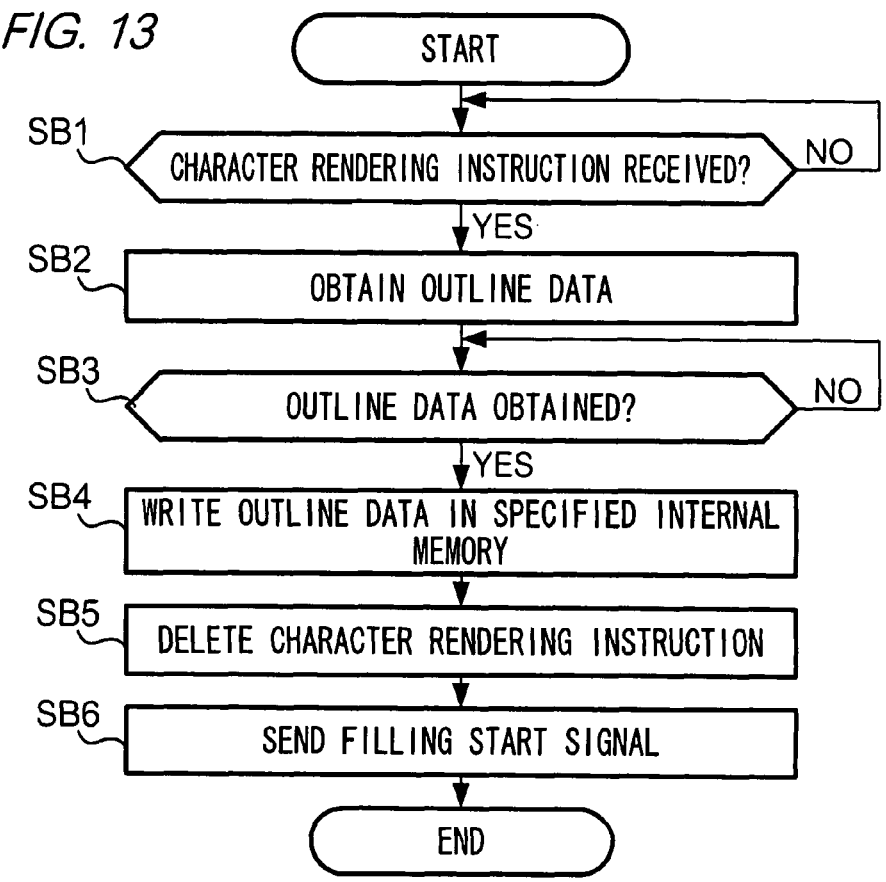
FIG. 13 is a flowchart of an operation performed by an outline drawing module.

FIG. 13 is a flowchart of an operation performed by outline drawing module 110.

Outline drawing module 110 of font processor 11 awaits a character rendering instruction sent from CPU 10, and on receiving a character rendering instruction relating to partial area T1 (step SB1; YES), outline drawing module 110 stores the character rendering instruction in a register (not shown). On receiving a character rendering instruction, outline drawing module 110 obtains outline data equivalent to one processing unit on the basis of a first address in ROM 15 in which outline data corresponding to the character code of the character "D" is stored (step SB2). Subsequently, outline drawing module 110 determines whether it has obtained all sets of outline data that are necessary for writing of contour data (step SB3). If outline drawing module 110 has not yet completed obtaining of all sets of outline data (step SB3; NO), the module continues to obtain outline data.

On the other hand, if outline drawing module 110 has completed obtaining of all sets of outline data (step SB3; YES), the module writes the contour data in internal memory 115-1 on the basis of data on types and positions of control points as shown in FIG. 5 (step SB4). After finishing writing of contour data that is necessary for a character drawing in partial area T1, outline drawing module 110 deletes the character drawing instruction in the register (step SB5). After that, outline drawing module 110 generates a filling start instruction to instruct starting of a filling operation, and sends it to filling module 111 (step SB6).

Subsequently, when outline drawing module 110 receives a character rendering instruction relating to partial area T2, the module performs a character rendering of partial area T2, as in the case of that of partial area T1, using internal memory 115-2 selected by CPU 10, as a work area.

2-5. Filling of Character by Filling Module 111

A filling operation of filing module 111 will be described. The filling operation is performed on the basis of contour data stored in internal memory 115.

Filling module 111 awaits a filling instruction relating to partial area T1, and on receiving a filling instruction (step SC1; YES), stores the filling instruction in a register (not shown). After that, filling module 111 determines whether there exists in internal memory 115-1 contour data that is yet to be subject to a filling operation (step SC2). If such outline data is stored in internal memory 115-1 (step SC2; YES), filling module 111 reads out contour data equivalent to one processing unit from internal memory 115-1 (step SC3).

After reading out contour data, filling module 111 fills an area surrounded by contours represented by the outline data (step SC4), and sends the processed image data to background synthesis/transfer module 112 (step SC5). Subsequently, filling module 111 performs step SC2 again to determine whether there exists in internal memory 115-1 any other contour data that is yet to be subject to a filling operation.

If such outline data is not stored in internal memory 115-1, namely, if a filling operation relative to all sets of contour data of partial area T1 is completed (step SC2; NO), filling module 111 deletes the filling start instruction stored in the register (step SC6), and sends a filling completion signal that notifies completion of a filling operation, to background synthesis/transfer module 112 (step SC7).

2-6. Background Synthesizing by Background Synthesis/Transfer Module 112

Figure 15:
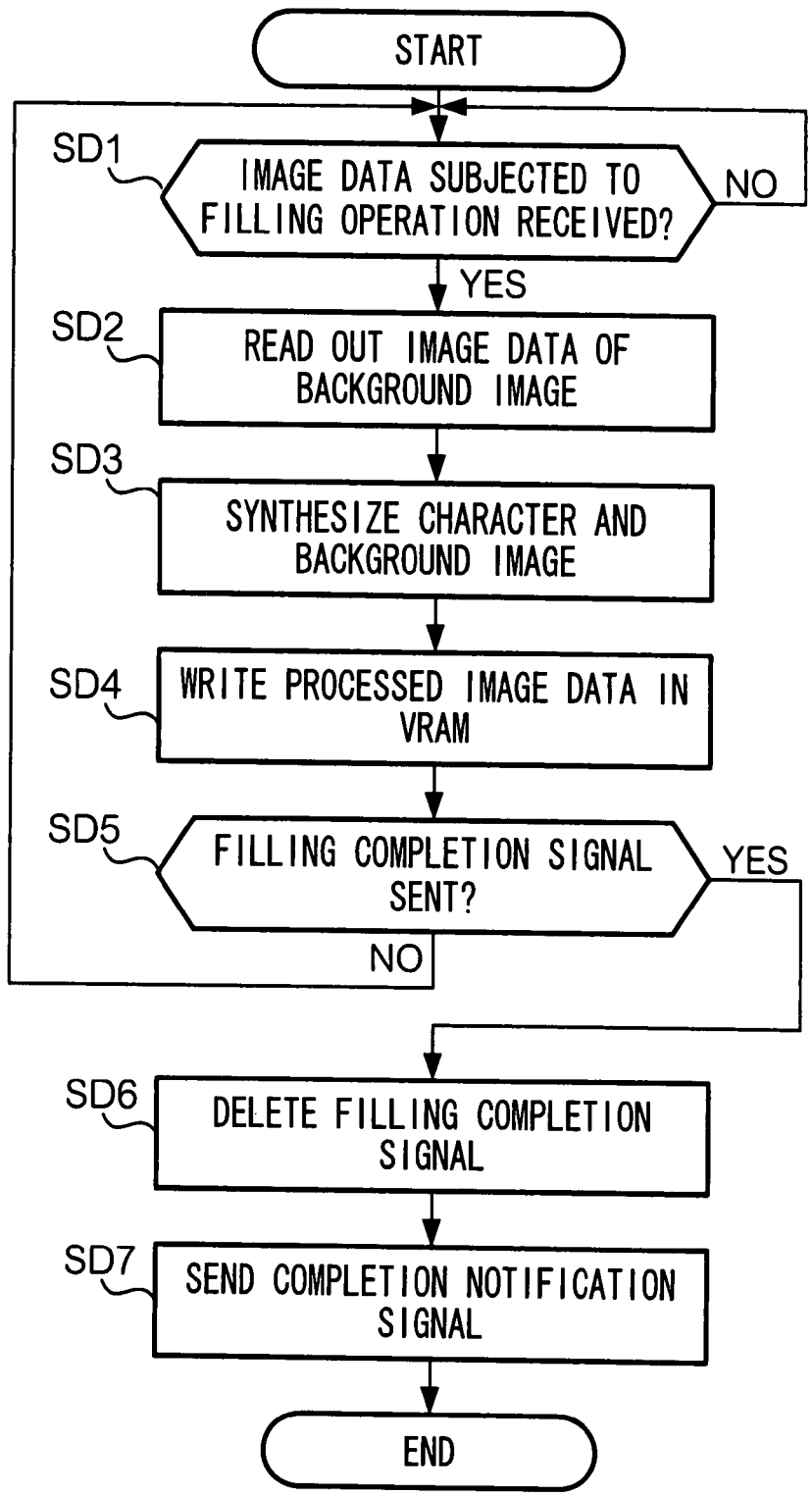
FIG. 15 is a flowchart of an operation performed by a background synthesis/transfer module.

An operation of background synthesis/transfer module 112 will be described. In the operation, background synthesis/transfer module 112 synthesizes a rendered character and a background image, and causes CPU 10 to transfer image data to display 14. FIG. 15 is a flowchart showing the operation.

Background synthesis/transfer module 112 awaits image data representing a character subjected to a filling operation that is provided from filling module 111, and on receiving image data (step SD1; YES), background synthesis/transfer module 112 reads out image data representing a background image from VRAM 17 (step SD2). Background synthesis/transfer module 112 synthesizes the image data representing a rendered character and the image data representing a background image (step SD3), to generate image data where a character is drawn on a background image corresponding to a prescribed display position. Background synthesis/transfer module 112 writes the generated image data in an area of VRAM 17 corresponding to a prescribed display position. Subsequently, background synthesis/transfer module 112 determines whether it has received a filling completion signal (step SD5). If background synthesis/transfer module 112 has not received a filling completion signal (step SD5; NO), the module performs step SD1 to await next image data. On the other hand, if background synthesis/transfer module 112 has received a filling completion signal (step SD5; YES), the module deletes the filling completion signal (step SD6), and sends a completion notification signal to CPU 10 (step SD7).

In response to the completion notification signal, CPU 10 transfers the image data stored in VRAM 17 to display controller 13, and instructs display controller 13 to display an image. In accordance with the instruction, display controller 13 causes display 14 to show an image represented by the image data.

According to the embodiment described above, CPU 10 calculates a division number on the basis of the size of a character to be rendered and the storage capacity of a memory, and selects a memory for use by font processor 11 on the basis of whether the division number exceeds a specified value. Since the specified value is a value for determining a memory that requires a shorter time to render a character, a memory selected based on the specified value realizes character rendering in a shorter time.

Also, according to the embodiment, font processor 11 has internal bus B-1 for reading out outline data and internal bus B-2 for writing/reading contour data in/from internal memory 115 or RAM 16. Consequently, font processor 11 is able to perform an outline rendering, a filling, and synthesizing/transferring in parallel.

3. Modifications

The above embodiment may be modified as described below.

3.1 Modification 1

In the above embodiment, where a character is divided in a width direction (in a main scanning direction) and thereafter rendering of the character is performed, a character may be divided in a height direction (in a sub-scanning direction), or divided both in a width direction and a height direction, and thereafter rendering of the character is performed.

3-2. Modification 2

In the above embodiment, where font processor 11 has bridge 116 for connecting internal bus B-1 and internal bus B-2, bridge 116 may be not provided. Instead, filling module 111 and internal bus B1 may be connected so that filling module 111 can read out contour data from RAM 16 through internal bus B-1 and external bus B.

If font processor 11 is thus configured, however, the number of memory addresses to be managed is increased.

If a bridge is provided, filling module 111 accesses internal memory 115 or RAM 16 via internal bus B-2. Namely, filling module 111 accesses two memories via a single bus. In this case, the two memories can be assumed to be one continuous memory, and therefore the two memories can be identified by one address. In contrast, if a bridge is not provided, filling module 111 accesses RAM 16 via internal bus B-1, while filling module 111 accesses internal memory 115 via internal bus B-2. Namely, filling module 111 accesses two memories via different buses. In this case, the two memories need to have different addressees.

3-3. Modification 3

In the above embodiment, where a character is rendered on the basis of outline font data, a character may be drawn on the basis of stroke font data. If stroke font data is used for rendering a character, first, central lines of strokes forming a character are specified, and second, the width of each stroke is specified. Namely, a character is rendered through plural steps. Therefore, if outline drawing module 110 and filling module 111 are replaced with a module for rendering center lines (character shape) of strokes forming a character and a module for painting peripheries of the center lines, respectively, the present invention can be applied to a character rendering based on stroke font data.

Alternatively, in the above embodiment, a character may be rendered on the basis of vector graphics. If vector graphics are used for drawing a character, operations of an outline rendering, a filling, and special effects are performed on the basis of coordinates of points and mathematical expressions for connecting the points to express lines, curves, and areas. Therefore, if modules capable of the operations are provided in the above embodiment, the present invention can be applied to a character rendering based on vector graphics.

3-4 Modification 4

Figure 14:
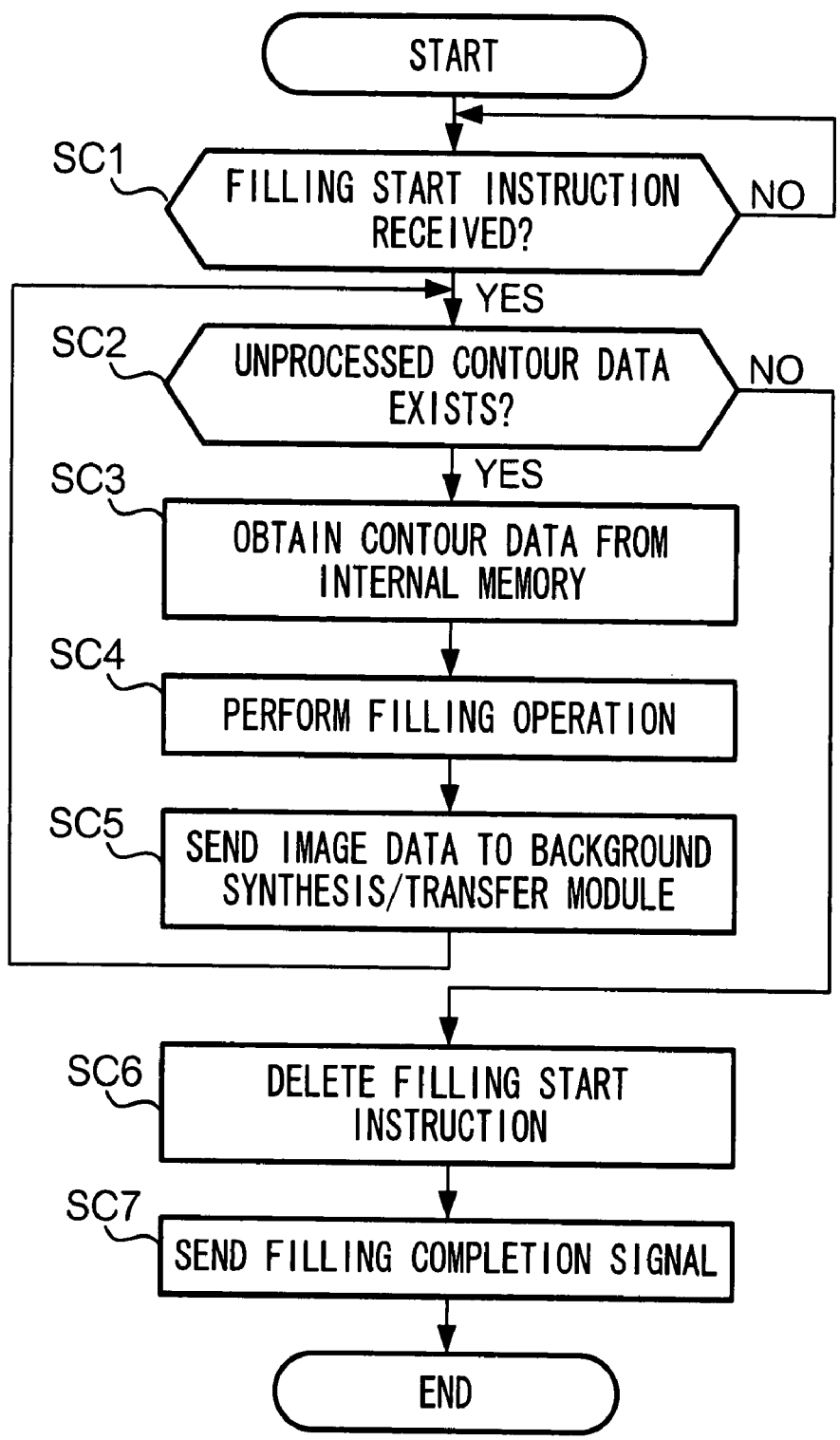
FIG. 14 is a flowchart of an operation performed by a filling module.

In the above embodiment, where filling module 111 outputs image data to background synthesis/transfer module 112, each time filling module 111 completes a filling operation relative to image data equivalent to one processing unit, filling module 111 may output image data to background synthesis/transfer module 112, after completing a filling operation relative to all sets of contour data. Namely, in an operation of FIG. 14, filling module 111 may perform step SC5, after determining that no contour data that is yet to be subject to a filling operation at step SC2 exists in a memory.

3-5. Modification 5

In the above embodiment, where filling module 111 and background synthesis/transfer module 112 are separate modules, the two modules may be replaced with a single dedicated module that is capable of performing the functions of the two modules. Since background synthesis/transfer module 112 does not access internal memory 115, and processes image data provided from filling module 111, background synthesis/transfer module 112 and filling module 111 are configurable to a single dedicated module in combination.

3-6. Modification 6

In the above embodiment, background synthesis/transfer module 112 may write image data provided from filling module 111 directly in VRAM 17, without synthesizing a character represented by the image with a background image.

3-7. Modification 7

In the above embodiment, where a character is rendered on a screen of display 14, a character may be rendered on a recording sheet. In this case, display controller 13 is replaced with a print controller, and display 14 is replaced with a printing unit. The print controller controls the printing unit to print an image on a recording sheet, and the printing unit prints an image on a recording sheet in a thermal transfer method or an ink-jet method.

In an aspect of the present modification, when image data, which represents an image to be printed on one recording sheet, is written in VRAM 17, and a completion notification signal is provided, CPU 10 sends the image data stored in VRAM 17 to a print controller, and instructs the print controller to print an image. In accordance with the instruction, the print controller causes a printing unit to print an image represented by the image data.

3-8. Modification 8

In the above embodiment, where characters "□" and "D" are illustrated as characters to be rendered, a character to be rendered may be a Japanese character such as a hiragana, katakana, or kanji character, or a foreign character such as a letter of the alphabet. Alternatively, a character to be rendered may be a symbol such as "+" or "−", or a figure such as a circle or a polygon. In essence, any character may be rendered, as long as font data of the character is available, and rendering of the character can be performed in accordance with the font data.

3-9. Modification 9

In the above embodiment, where internal memory 115 and RAM 16 have two work areas, respectively, they may have many more work areas. According to this modification, even if a font processor includes many more dedicated modules, the modules can independently access internal memories, so that many more operations can be carried out in parallel.

What is claimed is:

1. A character rendering device comprising:
    a first drawing unit that divides a shape of a character represented by character shape data into partial areas, and renders the shape of the character area by area;
    a second drawing unit that renders the character on the basis of the shape of the character rendered by the first drawing unit;
    a transfer unit that transfers the character rendered by the second drawing unit;
    a first memory that stores data;
    a second memory whose read/write rate is lower than that of the first memory, and whose storage capacity is larger than that of the first memory;
    a size determination unit that determines a size of each partial area; and
    a selection unit that, if a number of the partial areas created by the first drawing unit is equal to or smaller than a threshold value, value when the size of each partial area is determined by the size determination unit in accordance with the storage capacity of the first memory, selects the first memory, and if the number of the partial areas is larger than the threshold value, selects the second memory, wherein:
    if the first memory is selected by the selection unit, the first drawing unit writes data of the rendered shape of the character in the first memory, and the second drawing unit reads out the data of the shape of the character from the first memory and renders the character on the basis of the shape of the character; and
    if the second memory is selected by the selection unit, the size determination unit determines anew the size of each partial area in accordance with the storage capacity of the second memory, and the first drawing unit divides the shape of the character into partial areas whose size is determined by the size determination unit in accordance with the storage capacity of the second memory, renders the shape of the character area by area, and writes data of the rendered shape of the character in the second memory, and the second drawing unit reads out the data of the shape of the character from the second memory and renders the character on the basis of the shape of the character.

2. The character drawing device according to claim 1, further comprising:
    a first bus that is connected to the second memory via an external bus;
    a second bus that is connected to the first memory; and
    a connector that connects the first bus and the second bus, wherein:
    the first drawing unit is connected to the first bus and the second bus;
    if the first memory is selected by the selection unit, the first drawing unit writes data of the rendered shape of the character in the first memory via the second bus, and if the second memory is selected by the selection unit, the first drawing unit writes data of the rendered shape of the character in the second memory via the first bus and the external bus;
    the second drawing unit is connected to the second bus;

if the first memory is selected by the selection unit, the second drawing unit reads out the data of the shape of the character from the first memory via the second bus and renders the character on the basis of the shape of the character, and if the second memory is selected by the selection unit, the second drawing unit reads out the data of the shape of the character from the second memory via the external bus, the first bus, the connector, and the second bus, and renders the character on the basis of the shape of the character.

3. The character drawing device according to claim 1, further comprising:
a first bus that is connected to the second memory via an external bus;
a second bus that is connected to the first memory; and
a connector that connects the first bus and the second bus, wherein:
the first drawing unit is connected to the first bus and the second bus;
if the first memory is selected by the selection unit, the first drawing unit writes data of the drawn shape of the character in the first memory via the second bus, and if the second memory is selected by the selection unit, the first drawing unit writes data of the drawn shape of the character in the second memory via the first bus and the external bus;
the second drawing unit is connected to the first bus and the second bus;
if the first memory is selected by the selection unit, the second drawing unit reads out the data of the shape of the character from the first memory via the second bus and renders the character on the basis of the shape of the character, and if the second memory is selected by the selection unit, the second drawing unit reads out the data of the shape of the character from the second memory via the external bus and the first bus, and renders the character on the basis of the shape of the character.

4. The character drawing device according to claim 1, wherein:
the first memory and the second memory each have a plurality of memory areas;
each of the plurality of memory areas is assigned to each of the partial areas;
the first drawing unit writes data of the rendered shape of the character belonging to one of the partial areas in one of the plurality of memory areas assigned to the partial area; and
when the data of the shape of the character is written in one of the partial areas in one of the plurality of memory areas, the second drawing unit reads out the shape of the character from the memory area and renders the character on the basis of the shape of the character.

5. The character drawing device according to claim 1, wherein:
the character shape data is outline font data;
the first drawing unit renders an outline of the character on the basis of the outline font data; and
the second drawing unit fills an area surrounded by the outline of the character to render the character.

6. The character drawing device according to claim 1, wherein:
the character shape data is stroke font data;
the first drawing unit renders a center line of a stroke forming the character on the basis of the stroke font data; and
the second drawing unit paints a periphery of the center line of the stroke forming the character to render the character.

7. A display device comprising:
a character rendering device according to claim 1; and
a display that displays the character transferred by the transfer unit.

8. A printer comprising:
a character rendering device according to claim 1; and
a printing unit that prints the character transferred by the transfer unit.

9. A character rendering device comprising:
a first drawing unit that divides a shape of a character represented by character shape data into partial areas, and renders the shape of the character area by area;
a second drawing unit that renders the character on the basis of the shape of the character rendered by the first drawing unit;
a transfer unit that transfers the character rendered by the second drawing unit;
a first memory that stores data;
a second memory whose read/write rate is lower than that of the first memory, and whose storage capacity is larger than that of the first memory;
a first bus that is connected to the second memory via an external bus;
a second bus that is connected to the first memory;
a connector that connects the first bus and the second bus; and
a selection unit that, if a number of the partial areas created by the first drawing unit is equal to or smaller than a threshold value, selects the first memory, and if the number of the partial areas is larger than the threshold value, selects the second memory, wherein:
the first drawing unit is connected to the first bus and the second bus;
the second drawing unit is connected to the second bus;
if the first memory is selected by the selection unit, the first drawing unit writes data of the rendered shape of the character in the first memory via the second bus, and the second drawing unit reads out the data of the shape of the character from the first memory via the second bus and renders the character on the basis of the shape of the character; and
if the second memory is selected by the selection unit, the first drawing unit writes data of the rendered shape of the character in the second memory via the first bus and the external bus, and the second drawing unit reads out the data of the shape of the character from the second memory via the external bus, the first bus, the connector, and the second bus, and renders the character on the basis of the shape of the character.

* * * * *